May 21, 1940.  B. S. AIKMAN  2,201,572
AUTOMATIC SLACK ADJUSTER
Filed April 27, 1938
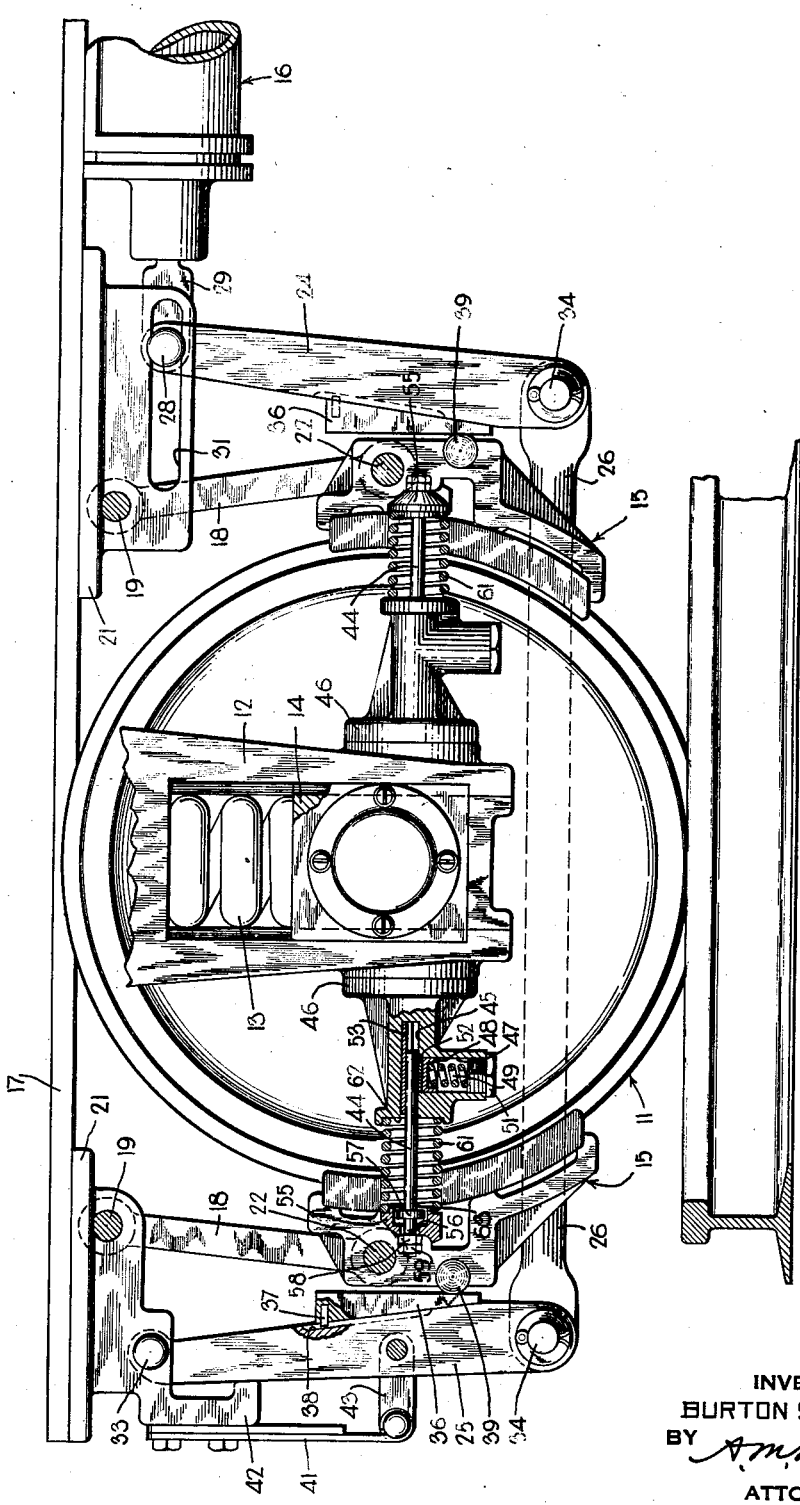
INVENTOR
BURTON S. AIKMAN
BY
ATTORNEY Patented May 21, 1940

2,201,572

UNITED STATES PATENT OFFICE 2,201,572

AUTOMATIC SLACK ADJUSTER

Burton S. Aikman, Wilkinsburg, Pa., assignor to The Westinghouse Air Brake Company, Wilmerding, Pa., a corporation of Pennsylvania Application April 27, 1938, Serial No. 204,539

9 Claims. (Cl. 188—198)

This invention relates to automatic slack adjusters for taking up the slack in the brake rigging of vehicles, such as railway cars, that develops due to wear of the brake shoes or other causes.

Various types of automatic slack adjusters are known, such as slack adjusters of the pawl and ratchet or screw type, which are operative in response to a longer than normal travel of a brake cylinder piston, caused by wear of the brake shoes or other parts of the brake rigging, to adjust the position of the levers in the brake rigging so as to continue to operate over a given angle of movement and incidentally cause the movement required to move the brake shoes into contact with the rim of the associated car wheel to be substantially constant.

It is an object of my present invention to provide an automatic slack adjuster of novel construction which is effective to maintain a predetermined normal clearance of an individual brake shoe from the rim of the associated car wheel and to automatically take up the slack in the brake rigging to maintain a definite working angle for the brake levers at all times.

It is also an object of my invention to provide mechanism for maintaining a predetermined normal clearance of an individual brake shoe with respect to the rim of an associated wheel, independently of variations in the travel of the brake cylinder piston.

It is a further object of my invention to provide an automatic slack adjuster and brake shoe clearance maintaining mechanism which is of heretofore unattained simplicity of construction and which is readily adaptable and applicable to existing brake rigging and brake shoe equipment.

The above objects, and other objects of my invention which will be made apparent hereinafter, are attained by means of a specific embodiment of my invention subsequently to be described and shown in the single figure of the accompanying drawing.

Description

Referring to the single figure of the drawing, there is illustratively shown a car wheel 11 suitably mounted and arranged in an associated wheel truck having a side frame member 12 resiliently supported on one or more coil springs 13 which are in turn supported on the journal box 14 for the axle of the wheel 11. Associated with the rim of the wheel 11 are a pair of brake shoes 15 adapted to be operated by a brake cylinder 16 mounted, for example, on a member 17 of the wheel truck. Each of the brake shoes 15 is supported by a link 18, the upper end of each link 18 being pivoted on a pin 19 carried in a corresponding bracket 21 attached to the truck member 17 and the lower end of each link being pivotally connected to the brake shoe, as by a pin 22 carried on the brake shoe.

The brake rigging comprises a so-called live lever 24, a so-called dead lever 25, and an equalizing link or lever 26. One end of the live lever 24 is pivotally connected, as by a pin 28, to the outer end of the operating piston stem 29 of the brake cylinder 16, the pin 28 being guided, as in a suitable slot 31 formed in one of the brackets 21. The upper end of the dead lever 25 is fixedly pivoted, as by a pin 33, to the other bracket 21, and the lower ends of the two levers 24 and 25 are connected, as by pins 34, to opposite ends of the equalizing lever 26.

According to my invention, there is additionally provided between each of the brake shoes 15 and its associated operating lever 24 or 25 a wedge element 36 which tapers downwardly from a relatively wide cross-section to a relatively narrow cross-section. One side of each of the wedge elements 36 slidably contacts the edge of the lever 24 or 25 and is guided vertically as by a pin 37 fixed in the wedge, which pin extends into and is guided in a vertically extending groove 38 formed in the edge of each of the levers 24 and 25. The opposite face of each wedge element 36 is substantially parallel to the outer face of the associated brake shoe 15 and contacts a roller 39 rotatively mounted on the brake shoe in such a manner as to project beyond the outer surface of the brake shoe and thus provide clearance between the wedge element and the outer surface of the brake shoe. The function of the wedge element 36 will be made apparent hereinafter.

According to my invention, there is also provided a leaf spring 41 for yieldingly urging the dead lever 25 to its normal brake releasing position shown in the drawing, wherein it contacts a stop lug 42 formed on the associated bracket 21. As shown in the drawing, one end of the spring 41 is secured to the bracket 21 and the free end of the spring is connected as by a link 43 to a point on the dead lever 25 intermediate the ends thereof. The purpose of the leaf spring 41 will be made apparent hereinafter.

There is also further provided, according to my invention, a clearance pin or rod 44 for each of the brake shoes 15. The mounting arrangement of each clearance rod is the same and accordingly, the arrangement and operation of only one clearance rod 44 will be described, it being understood that the clearance rod for each brake shoe functions in the same manner. One end of the clearance rod 44 is received in a suitable bore 45 in a casing member 46 secured as by bolts, not shown, to the journal box 14. Opening transversely out of the bore 45 in the casing member 46 is a bore 47 in which is contained a small piston or plunger 48 which is yieldingly biased into frictional contact with the rod 44 by a coil spring 49 interposed between the back of the piston 48 and a screw plug 51 secured in the outer open end of the bore 47. If desired, the piston 48 may be provided, on the upper face thereof, with a suitable facing member 52 of friction material conforming in curvature to the curvature of the rod 44; and a suitable sleeve or bushing 53 of friction material may be provided in the bore 45 to obtain a desired frictional force for resisting sliding movement of the clearance rod 44 in the bore 45.

The brake shoe 15 is provided with a transversely extending portion 55 having a circular opening 56 through which the outer end of the clearance rod 44 extends.

Fixed to or formed integrally on the clearance rod 44 is a collar or flange 57 which is located on the axle side of the transverse portion 55 of the brake shoe 15, a suitable nut 58 and lock nut 59 being provided on the threaded outer end of the clearance rod on the opposite side of the transverse portion 55 in such spaced relation to the collar 57 as to permit a desired degree of movement of the brake shoe 15 relative to the clearance rod 44.

Disposed in concentric relation to the clearance rod 44 is a coil spring 61 which is interposed between the casing member 46 and the transverse portion 55 of the brake shoe 15 in such manner as to yieldingly resist movement of the brake shoe 15 from its normal release position shown, toward the rim of the car wheel. For purposes of illustration, one end of the spring 61 is received in a suitable recess 62 in the face of the casing member 46 and the opposite end of the spring fits over an annular rib 63 formed on the transverse portion 55 of the brake shoe, to support the spring and maintain it in place.

*Operation*

In operation, when fluid under pressure is supplied to the brake cylinder 16 to effect application of the brakes, the piston stem 29 of the brake cylinder 16 is shifted outwardly in the left-hand direction, as seen in the drawing, to cause movement of the right-hand brake shoe 15 in the left-hand direction into contact with the rim of the wheel 11 and, through the equalizing lever 26, also movement of the left-hand brake shoe 15 in the right-hand direction into contact with the rim of the wheel 11, in the conventional manner.

As each brake shoe moves toward the rim of the car wheel 11, the transverse portion 55 on each brake shoe first moves relatively to the associated clearance rod 44 and then engages the collar 57 thereon. The clearance rod 44 is thus shifted toward the wheel axle against the yielding frictional resistance effected by the engagement therewith of piston 48, to an inner position corresponding to the maximum inward braking position of the brake shoe 15 while in contact with the rim or other braking surface on the wheel 11.

Upon the release of fluid under pressure from the brake cylinder 16, the piston stem or rod 29 is returned in the right-hand direction by the action of the leaf spring 41, and accordingly the force exerted to apply the brake shoes 15 to the rim of the car wheel 11 is relieved. When the pressure in the brake cylinder 16 is reduced sufficiently, each brake shoe 15 is shifted out of contact with the rim of the car wheel 11 by the associated coil spring 61. The clearance rod 44 does not move with the brake shoe because it is held frictionally in the bore 45 by the piston 48. Thus, each brake shoe 15 is shifted away from the rim of the car wheel by the associated spring 61 until the transverse portion 55 on the brake shoe 15 engages the nut 58 on the end of the clearance rod 44. The frictional force holding the rod 44 against movement exerted by the piston 48 is stronger than the outward force of coil spring 61 and thus further outward movement of the brake shoe 15 is prevented. Accordingly, the brake shoe 15 cannot be shifted more than the predetermined distance away from the rim of the car wheel permitted by the position of the nut 58 on the rod 44. Obviously, the position of the nut 58 relative to the collar 57 may be varied so as to vary the amount of relative movement permitted between the brake shoe and the rod 44 and therefore the normal clearance of the brake shoe from the rim of the car wheel.

The leaf spring 41 is effective to insure the return of the dead lever 25 into its normal position in contact with the stop lug 42 upon the release of the brakes, which it might be prevented from doing, except for the spring, due to rusting of the levers and other causes resulting in high friction. Thus, if due to wear on the wheel-contact-surface of the brake shoe 15, the degree of movement of the brake shoe 15 away from the rim of the car wheel 11 is less than the movement of the lever 24 or 25, the wedge element 36 falls automatically by gravity to fill in the gap which develops between the roller 39 on the brake shoe and the edge of the lever 24 or 25.

It is intended that the wedge element 36 be of sufficient weight to insure downward movement thereof whenever necessary in order to fill in the gap between the roller 39 on the brake shoe and the lever 24 or 25. If desired, the wedge element 36 may be suitably biased by a spring to insure downward movement of the wedge element 36 whenever necessary.

It will be apparent that upon a subsequent application of the brakes, the brake levers 24 and 25 are shifted through substantially the same operating or working angle for a given degree of application of the brakes, notwithstanding the wearing away of the wheel-contact-surface of the brake shoe 15.

It will likewise be apparent that, upon further wearing away of the wheel-contact-surface of the brake shoe 15, the position of the clearance rod 44 is constantly adjusted inwardly toward the wheel axle and thus regardless of such wear, a constant normal clearance between the wheel-contact-surface of the brake shoe 15 and the rim of the car wheel 11 is maintained.

One of the salient advantages of the slack-adjuster and brake shoe clearance maintaining device constituting my invention is that the clearance of each brake shoe is maintained individually and independently of the adjustment of other brake shoes and also that the operation thereof is unaffected by wear or distortion of the parts and levers of the brake rigging.

While I have disclosed only one specific embodiment of my invention, it will be apparent that various omissions, additions or modifications may be made in the embodiment shown without departing from the spirit of my invention. It is accordingly not my intention to limit the scope of my invention except as it is necessitated by the scope of the prior art.

Having now described my invention, what I claim as new and desire to secure by Letters Patent, is:

1. In combination, a car wheel having an axle and a journal housing for said axle, a brake shoe adapted to be shifted from a normal release position to a brake application position in engagement with a braking surface on the said wheel, an element supported by the said journal housing and having a loose connection with said brake shoe to permit a limited amount of movement of the brake shoe relative to said element, said brake shoe being effective when shifted in a brake applying direction from its normal position to shift said element in one direction to a position corresponding to the braking position of said shoe and effective upon movement in a brake releasing direction to shift relative to said element to the limit of movement permitted, and means for preventing movement of said element by said brake shoe in a direction opposite to said one direction when the brake shoe is shifted in the brake releasing direction whereby to cause a constant normal clearance between the brake shoe and the braking surface on the car wheel to be maintained.

2. An automatic slack adjusting mechanism comprising, in combination, a brake shoe so mounted and arranged as to be moved into contact with the rim of a vehicle wheel, an operating lever for said shoe disposed in the plane of said shoe in spaced angular relation thereto, a wedge element interposed between the brake shoe and the lever through which the force exerted by said lever is transmitted to move the brake shoe into contact with the rim of the vehicle wheel, resilient yielding means for always returning the said lever to a given normal position upon the release of the force applied to displace it from its normal position, resilient yielding means for shifting said brake shoe out of contact with and away from the rim of the vehicle wheel, and means for preventing said last resilient means from shifting the brake shoe more than a given constant distance away from the rim of the vehicle wheel, said wedge element being effective to constantly fill the space between the brake shoe and the lever notwithstanding that the space between the brake shoe and the lever increases due to wear on the brake shoe, thereby taking up the slack and maintaining a substantially constant working angle for the lever.

3. In combination, a brake shoe associated with a rotatable member to be braked, means for applying a force to shift the brake shoe into contact with a braking surface on the rotatable member, resilient yielding means for shifting said brake shoe away from the braking surface on the rotatable member upon diminution of the force applied by the force applying means, an element so constructed and arranged as to have a loose connection with the brake shoe permitting a certain limited amount of movement of the brake shoe with respect to the said element, and means constantly effective to resist movement of said element, said resisting means being ineffective to prevent movement of the said element to a position corresponding to the brake application position of the brake shoe in response to the force exerted by the force applying means and effective to prevent movement of said element by said resilient yielding means while urging the brake shoe away from the braking surface on said rotatable member, said element being thus constantly effective to limit the movement of the brake shoe away from the braking surface on the rotatable member to a substantially constant amount corresponding to the certain amount of relative movement between the said element and the brake shoe.

4. In combination, a brake shoe associated with a rotatable member to be braked, means for applying a force to shift the brake shoe into contact with a braking surface on the rotatable member, resilient yielding means for shifting said brake shoe away from the braking surface on the rotatable member upon diminution of the force applied by the force applying means, an element so constructed and arranged as to have a loose connection with the brake shoe permitting a certain limited amount of movement of the brake shoe with respect to the said element, and friction means constantly effective to resist movement of said element, said friction means being ineffective to exert a sufficient resisting force to prevent movement of said element to a position corresponding to the brake application position of the brake shoe in response to the force exerted on the brake shoe by the force applying means and effective to exert a sufficient force to prevent movement of the said element by the force of said resilient yielding means effective to return the brake shoes in a brake releasing direction, said element being thereby constantly positioned to limit the releasing movement of the brake shoes away from the braking surface of the rotatable member to a constant amount corresponding to the certain amount of relative movement between the brake shoe and said element.

5. In combination with a car wheel having an axle and a journal housing for said axle, a brake shoe adapted to be moved from a normal release position to an application position with respect to said wheel, an element movably supported by the said journal housing and associated with said brake shoe by a loose connection permitting a certain limited amount of relative movement between the brake shoe and the said element, said brake shoe being effective when shifted into its application position more than an amount corresponding to the amount of relative movement between the brake shoe and the said element to shift the said element in an application direction to a position corresponding to the braking position of said shoe and effective upon movement in a brake releasing direction to shift the certain limited amount relative to said element and then exert a force tending to move said element in the brake releasing direction, and means for preventing movement of said element by said brake shoe in the brake releasing direction whereby said brake shoe is prevented from having more than a constant normal clearance with respect to the braking surface on the vehicle wheel and corresponding to the certain limited amount of relative movement between the brake shoe and the said element.

6. In combination with a car wheel having an axle and a journal housing for said axle, a brake shoe adapted to be moved from a normal release position to an application position with respect to said wheel, an element movably supported by the said journal housing and associated with said brake shoe by a loose connection permitting a certain limited amount of relative movement between the brake shoe and the said element, said brake shoe being effective when shifted out of its release position toward its application position more than an amount corresponding to the certain limited amount of relative movement between the brake shoe and the said element to shift the said element in one direction to a position corresponding to the braking position of said shoe and effective upon movement in a brake releasing direction to first shift the certain limited amount relative to said element in the brake releasing direction and then exert a force tending to shift said element in a direction opposite to said one direction, and means carried by the journal housing for constantly resisting movement of said element, said resisting means being ineffective to prevent movement of said element by the brake applying force exerted on the brake shoe but effective to prevent movement of the brake shoe away from the braking surface on the car wheel when the brake shoe tends to shift said element after the brake shoe has shifted the certain limited amount relative to said element.

7. An automatic slack adjusting mechanism for a brake shoe adapted to be moved into frictional contact with a braking surface on a car wheel, comprising in combination an operating lever disposed in spaced angular relation to said shoe, a wedge element interposed between the brake shoe and the said lever through which the force exerted by said lever is transmitted to move the brake shoe into contact with the braking surface on the car wheel, resilient yielding means effective to always return the said lever to a given normal position upon the release of the force applied thereto to move the brake shoe, resilient yielding means for shifting said brake shoe away from the braking surface on the car wheel, a shiftable element having a loose connection with the brake shoe permitting a certain limited amount of relative movement between the brake shoe and said element, means constantly effective to resist movement of said element, said resisting means being ineffective to prevent movement of said element by the brake shoe in one direction in response to the brake applying force exerted through said lever but effective to prevent movement of said element in the opposite direction by the resilient yielding means when acting to shift the brake shoe away from the braking surface of the car wheel, said element being thereby effective to maintain a constant normal clearance between the brake shoe and the braking surface corresponding to the certain limited amount of relative movement between the brake shoe and said element, said wedge element being constantly effective to fill the space between the brake shoe and the said lever when the space between the brake shoe and said lever increases due to wear on the brake shoe so as to maintain a constant working angle for the said lever.

8. In combination with a car wheel and its associated axle journal housing, a plurality of brake shoes cooperating at different points respectively with a braking surface on the said car wheel, common means for shifting the brake shoes from a normal release position thereof to an application position and exerting a brake applying force thereon, an element for each of said brake shoes carried by the journal housing and having a loose connection with its corresponding brake shoe permitting a certain limited amount of relative movement between the brake shoe and the element, means adapted to permit movement of each element into a position corresponding to the brake application position of the corresponding brake shoe and effective to prevent movement of the said element by the brake shoe upon movement of the brake shoe in a brake releasing direction, each element being adapted thereby to maintain a constant normal clearance between the brake shoes and the braking surface corresponding to the certain limited amount of relative movement between each element and the corresponding shoe.

9. In combination with a car wheel, a plurality of individually movable brake shoes associated at different points with a braking surface on the car wheel, a live lever associated in spaced angular relation with one of said brake shoes, a dead lever associated in spaced angular relation with another of said brake shoes, an equalizing link connecting said live and said dead levers, a wedge element adapted to fill the space between the live lever and the associated brake shoe, another wedge element adapted to fill the space between the said dead lever and its associated brake shoe, individual means associated with each brake shoe for maintaining a constant normal clearance between the corresponding brake shoe and the braking surface, and resilient means for returning said live and dead levers always to the same normal position thereof, said wedge element being effective respectively upon an increase in the space between the said levers and the associated brake shoes due to wear of the brake shoe to always fill the space and thus maintain a constant working angle for said levers.

BURTON S. AIKMAN.